US010334346B2

(12) United States Patent
Boesen et al.

(10) Patent No.: US 10,334,346 B2

(45) Date of Patent: Jun. 25, 2019

(54) REAL-TIME MULTIVARIABLE BIOMETRIC ANALYSIS AND DISPLAY SYSTEM AND METHOD

(71) Applicant: BRAGI GmbH, München (DE)

(72) Inventors: Peter Vincent Boesen, München (DE); Martin Steiner, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/464,842

(22) Filed: Mar. 21, 2017

(65) Prior Publication Data

US 2017/0280222 A1 Sep. 28, 2017

Related U.S. Application Data

(60) Provisional application No. 62/312,901, filed on Mar. 24, 2016.

(51) Int. Cl.
*G06F 3/01* (2006.01)
*H04R 1/10* (2006.01)

(52) U.S. Cl.
CPC ......... *H04R 1/1016* (2013.01); *H04R 1/1091* (2013.01); *G06F 3/011* (2013.01); *H04R 2420/07* (2013.01)

(58) Field of Classification Search
CPC ............. H04M 1/6058; H04M 1/6066; H04M 2250/12; H04M 1/05
USPC ................................ 381/74, 328, 56; 379/38
See application file for complete search history.

(56) References Cited

U.S. PATENT DOCUMENTS

| | | | |
|---|---|---|---|
| 3,934,100 | A | 1/1976 | Harada |
| 4,150,262 | A | 4/1979 | Ono |
| 4,334,315 | A | 6/1982 | Ono et al. |
| 4,375,016 | A | 2/1983 | Harada |
| 4,588,867 | A | 5/1986 | Konomi |
| 4,654,883 | A | 3/1987 | Iwata |
| 4,682,180 | A | 7/1987 | Gans |
| 4,791,673 | A | 12/1988 | Schreiber |
| 4,865,044 | A | 9/1989 | Wallace et al. |
| 5,191,602 | A | 3/1993 | Regen et al. |
| 5,201,007 | A | 4/1993 | Ward et al. |

(Continued)

FOREIGN PATENT DOCUMENTS

| | | |
|---|---|---|
| CN | 204244472 U | 4/2015 |
| CN | 104683519 A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Alexander Jamal
(74) *Attorney, Agent, or Firm* — Goodhue, Coleman & Owens, P.C.

(57) ABSTRACT

A system, method and personal area network for communicating utilizing a wireless earpiece. Sensor measurements of a user are performed utilizing sensors of the wireless earpieces. The sensor measurements are analyzed. A determination is made whether the sensor measurements exceed two or more thresholds. An alert is communicated to the user in response to the two or more thresholds being exceeded.

12 Claims, 6 Drawing Sheets

BEGIN
LINK ONE OR MORE WIRELESS EARPIECES WITH A COMMUNICATIONS DEVICE 302
PERFORM SENSOR MEASUREMENTS 304
ANALYZE THE SENSOR MEASUREMENTS 306
SENSOR MEASUREMENT THRESHOLDS EXCEEDED? 308
No
UTILIZE ADDITIONAL SENSORS AS NEEDED 312
Yes
SEND COMMUNICATIONS REGARDING THE USER'S CONDITION 310

(56) References Cited

U.S. PATENT DOCUMENTS 5,280,524 A 1/1994 Norris
5,295,193 A 3/1994 Ono
5,298,692 A 3/1994 Ikeda et al.
5,343,532 A 8/1994 Shugart
5,363,444 A 11/1994 Norris
5,497,339 A 3/1996 Bernard
5,606,621 A 2/1997 Reiter et al.
5,613,222 A 3/1997 Guenther
5,692,059 A 11/1997 Kruger
5,721,783 A 2/1998 Anderson
5,749,072 A 5/1998 Mazurkiewicz et al.
5,771,438 A 6/1998 Palermo et al.
5,802,167 A 9/1998 Hong
5,929,774 A 7/1999 Charlton
5,933,506 A 8/1999 Aoki et al.
5,949,896 A 9/1999 Nageno et al.
5,987,146 A 11/1999 Pluvinage et al.
6,021,207 A 2/2000 Puthuff et al.
6,054,989 A 4/2000 Robertson et al.
6,081,724 A 6/2000 Wilson
6,094,492 A 7/2000 Boesen
6,111,569 A 8/2000 Brusky et al.
6,112,103 A 8/2000 Puthuff
6,157,727 A 12/2000 Rueda
6,167,039 A 12/2000 Karlsson et al.
6,181,801 B1 1/2001 Puthuff et al.
6,208,372 B1 3/2001 Barraclough
6,230,029 B1 5/2001 Yegiazaryan et al.
6,275,789 B1 8/2001 Moser et al.
6,339,754 B1 1/2002 Flanagan et al.
6,408,081 B1 6/2002 Boesen
6,424,820 B1 7/2002 Burdick et al.
D464,039 S 10/2002 Boesen
6,470,893 B1 10/2002 Boesen
D468,299 S 1/2003 Boesen
D468,300 S 1/2003 Boesen
6,542,721 B2 4/2003 Boesen
6,560,468 B1 5/2003 Boesen
6,654,721 B2 11/2003 Handelman
6,664,713 B2 12/2003 Boesen
6,694,180 B1 2/2004 Boesen
6,718,043 B1 4/2004 Boesen
6,738,485 B1 5/2004 Boesen
6,748,095 B1 6/2004 Goss
6,754,358 B1 6/2004 Boesen et al.
6,784,873 B1 8/2004 Boesen et al.
6,823,195 B1 11/2004 Boesen
6,852,084 B1 2/2005 Boesen
6,879,698 B2 4/2005 Boesen
6,892,082 B2 5/2005 Boesen
6,920,229 B2 7/2005 Boesen
6,952,483 B2 10/2005 Boesen et al.
6,987,986 B2 1/2006 Boesen
7,136,282 B1 11/2006 Rebeske
7,203,331 B2 4/2007 Boesen
7,209,569 B2 4/2007 Boesen
7,215,790 B2 5/2007 Boesen et al.
7,463,902 B2 12/2008 Boesen
7,508,411 B2 3/2009 Boesen
7,825,626 B2 11/2010 Kozisek
7,979,035 B2 7/2011 Griffin et al.
7,983,628 B2 7/2011 Boesen
8,095,188 B2 1/2012 Shi
8,140,357 B1 3/2012 Boesen
8,300,864 B2 10/2012 Müllenborn et al.
8,436,780 B2 5/2013 Schantz et al.
8,719,877 B2 5/2014 VonDoenhoff et al.
8,891,800 B1 11/2014 Shaffer
8,994,498 B2 3/2015 Agrafioti et al.
9,013,145 B2 4/2015 Castillo et al.
9,037,125 B1 5/2015 Kadous
9,081,944 B2 7/2015 Camacho et al.
9,510,159 B1 11/2016 Cuddihy et al.
2001/0005197 A1 6/2001 Mishra et al.
2001/0027121 A1 10/2001 Boesen
2001/0056350 A1 12/2001 Calderone et al.
2002/0002413 A1 1/2002 Tokue
2002/0007510 A1 1/2002 Mann
2002/0010590 A1 1/2002 Lee
2002/0030637 A1 3/2002 Mann
2002/0046035 A1 4/2002 Kitahara et al.
2002/0057810 A1 5/2002 Boesen
2002/0076073 A1 6/2002 Taenzer et al.
2002/0118852 A1 8/2002 Boesen
2003/0002705 A1 1/2003 Boesen
2003/0065504 A1 4/2003 Kraemer et al.
2003/0100331 A1 5/2003 Dress et al.
2003/0104806 A1 6/2003 Ruef et al.
2003/0115068 A1 6/2003 Boesen
2003/0125096 A1 7/2003 Boesen
2003/0218064 A1 11/2003 Conner et al.
2004/0070564 A1 4/2004 Dawson et al.
2004/0160511 A1 8/2004 Boesen
2005/0017842 A1 1/2005 Dematteo
2005/0043056 A1 2/2005 Boesen
2005/0125320 A1 6/2005 Boesen
2005/0148883 A1 7/2005 Boesen
2005/0165663 A1 7/2005 Razumov
2005/0196009 A1 9/2005 Boesen
2005/0251455 A1 11/2005 Boesen
2005/0266876 A1 12/2005 Boesen
2006/0029246 A1 2/2006 Boesen
2006/0074671 A1 4/2006 Farmaner et al.
2006/0074808 A1 4/2006 Boesen
2006/0166715 A1 7/2006 Engelen et al.
2006/0258412 A1 11/2006 Liu
2008/0090622 A1 4/2008 Kim et al.
2008/0146890 A1 6/2008 LeBoeuf et al.
2008/0254780 A1 10/2008 Kuhl et al.
2009/0017881 A1 1/2009 Madrigal
2009/0073070 A1 3/2009 Rofougaran
2009/0085873 A1* 4/2009 Betts .................. G08B 13/1427 345/169
2009/0105548 A1* 4/2009 Bart .................. A61B 5/02438 600/300
2009/0296968 A1 12/2009 Wu et al.
2010/0033313 A1 2/2010 Keady et al.
2010/0203831 A1 8/2010 Muth
2010/0320961 A1 12/2010 Castillo et al.
2011/0286615 A1 11/2011 Olodort et al.
2013/0012788 A1* 1/2013 Horseman ........... G06F 19/3418 600/301
2013/0237793 A1* 9/2013 Farrugia ............ A61B 5/02405 600/383
2014/0122116 A1 5/2014 Smythe
2014/0163771 A1 6/2014 Demeniuk
2014/0185828 A1 7/2014 Helbling
2014/0222462 A1 8/2014 Shakil et al.
2014/0270227 A1 9/2014 Swanson
2014/0270271 A1 9/2014 Dehe et al.
2014/0273858 A1* 9/2014 Panther ................ A61B 5/0002 455/41.2
2015/0028996 A1 1/2015 Agrafioti et al.
2015/0148989 A1 5/2015 Cooper et al.
2015/0245127 A1 8/2015 Shaffer
2016/0033280 A1 2/2016 Moore et al.
2016/0073189 A1 3/2016 Linden et al.
2017/0164089 A1* 6/2017 Lee ...................... H04R 1/1025
2017/0215011 A1* 7/2017 Goldstein ............ H04R 25/305

FOREIGN PATENT DOCUMENTS

CN 104837094 A 8/2015
EP 1017252 A3 5/2006
EP 2903186 A1 8/2015
GB 2074817 4/1981
GB 2508226 A 5/2014
JP 06292195 10/1998
WO 2008103925 A1 8/2008
WO 2007034371 A3 11/2008
WO 2011001433 A2 1/2011
WO 2012071127 A1 5/2012
WO 2013134956 A1 9/2013

(56) References Cited

FOREIGN PATENT DOCUMENTS

| | | | |
|---|---|---|---|
| WO | 2014043179 | A2 | 3/2014 |
| WO | 2015061633 | A2 | 4/2015 |
| WO | 2015110577 | A1 | 7/2015 |
| WO | 2015110587 | A1 | 7/2015 |
| WO | 2016032990 | A1 | 3/2016 |

OTHER PUBLICATIONS

Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From The First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces A Health + Mobility Concept for Wellness in Mobility", Fountain Valley, Californa (2017).
Last Push Before the Kickstarter Campaign Ends on Monday 4pm CET (Mar. 28, 2014).
Loprinzi et al., "Mental Health and Physical Activity", vol. 4, Issue 2, Dec. 2011 pp. 65-69.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

* cited by examiner

REAL-TIME MULTIVARIABLE BIOMETRIC ANALYSIS AND DISPLAY SYSTEM AND METHOD

PRIORITY STATEMENT

This application claims priority to U.S. Provisional Patent Application 62/312,901, filed on Mar. 24, 2016, and entitled Real-Time Multivariable Biometric Analysis and Display System and Method, hereby incorporated by reference in its entirety.

BACKGROUND

I. Field of the Disclosure

The illustrative embodiments relate to wireless earpieces. More specifically, but not exclusively, the illustrative embodiments relate to wireless earpieces for monitoring user biometrics and actions.

II. Description of the Art

The growth of wearable devices is increasing exponentially. This growth is fostered by the decreasing size of microprocessors, circuitry boards, chips, and other components. In some cases, wearable devices may obtain biometric data. An important aspect of biometric data is monitoring a user's safety, ongoing activities, and conditions. In some cases, determining and reporting the user's biometrics and condition may be difficult because of location, position, effects of the user's condition, or user activity.

SUMMARY OF THE DISCLOSURE

One embodiment of the illustrative embodiments provides a system, method and personal area network for communicating utilizing a wireless earpiece. Sensor measurements of a user are performed utilizing sensors of the wireless earpieces. The sensor measurements are analyzed. A determination is made whether the sensor measurements exceed two or more thresholds. An alert is communicated to the user in response to the two or more thresholds being exceeded.

Another embodiment provides wireless earpieces including a processor and a memory storing a set of instructions. The set of instructions are executed to perform the method described.

Another embodiment provides a wireless earpiece. The wireless earpiece may include a frame for fitting in an ear of a user. The wireless earpiece may also include a logic engine controlling functionality of the wireless earpiece. The wireless earpiece may also a number of sensors measuring Homeric readings of the user. The wireless earpiece may also include a transceiver communicating with at least a wireless device. The logic engine analyzes the biometric readings, determines whether the sensor measurements exceed two or more thresholds, and communicates an alert to the user in response to the two or more thresholds being exceeded.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

Figure 1:
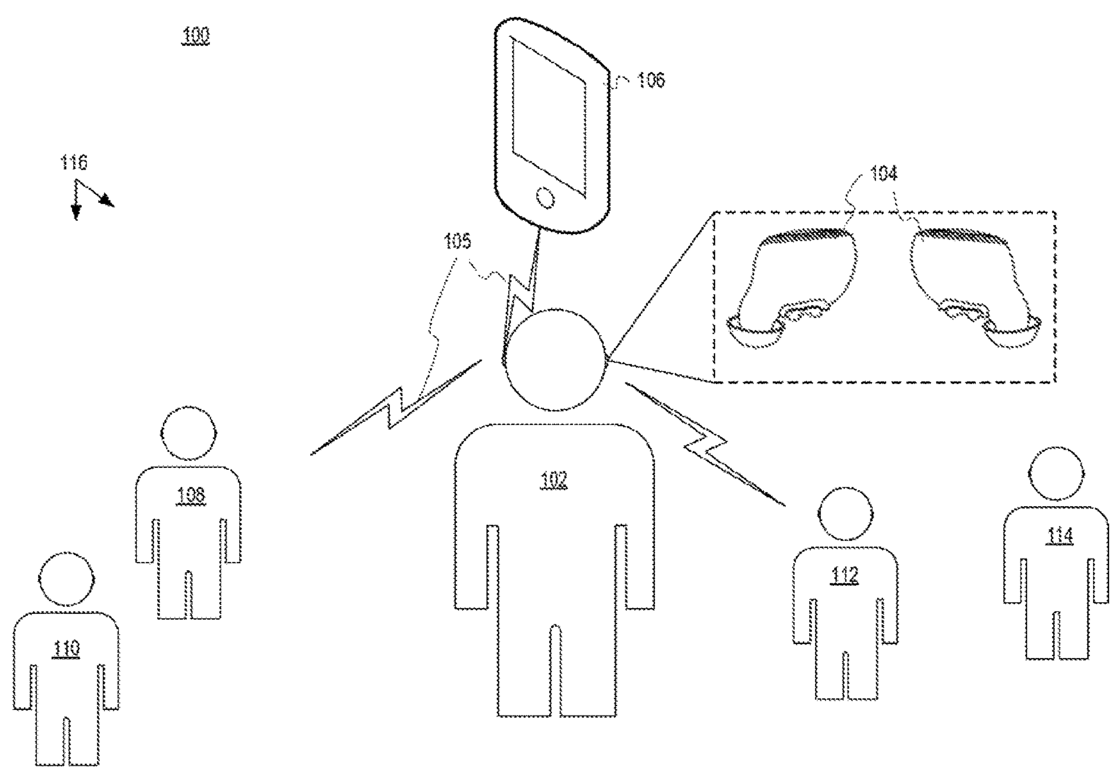
FIG. 1 is a pictorial representation of a communication system in accordance with an illustrative embodiment.

The illustrative embodiments provide a system, method, and personal area network for determining a user's condition and associated biometrics. In response to the user's biometrics exceeding a number of thresholds, an alert may be communicated to the wireless earpieces or through one or more additional computing or communications devices. In one embodiment, the wireless earpieces may be part of a personal area network.

The wireless earpieces may be utilized to control, communicate, manage, or interact with a number of other wearable devices, such as smart glasses, helmets, smart glass, watches or wrist bands, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, near field magnetic induction (NFMI), Bluetooth, Z-Wave, ZigBee, Wi-Fi, ANT+ or other applicable radio frequency signals. In one embodiment, the personal area network may move with the user.

The wireless earpieces may include any number of sensors for reading user biometrics, such as pulse rate, blood pressure, blood oxygenation, temperature, calories expended, blood content, voice and audio output, impact levels, and orientation (e.g., body, head, etc.). The sensors may also determine the user's location, position, velocity, impact levels, and so forth. The sensors may also receive user input and convert the user input into commands or selections made across the personal devices of the personal area network. For example, the user input detected by the wireless earpieces may include voice commands, head motions, linger taps, finger swipes, motions or gestures, or other user inputs sensed by the wireless earpieces. The user input may be determined and converted into commands that may be sent to one or more external devices, such as a tablet computer, smart phone, or so forth.

The wireless earpieces may perform sensor measurements for the user to read any number of user biometrics. The user biometrics may be analyzed including measuring deviations of the sensor measurements over time, identifying trends of the sensor measurements, and comparing the sensor measurements to control data for the user. As the sensor measurements are analyzed, analysis is per to determine whether they exceed one or more thresholds. The thresholds may be set by default, the user, an administrator, a caregiver, or other parties. The thresholds may include a high threshold and a low threshold (e.g., temperature, blood pressure, heart rate, etc.) that may be utilized to determine whether an event is automatically triggered by the wireless earpieces. The event may include a communication to the user including a warning that the two or more thresholds have been exceeded. It is to be understood that a multivariable biometric analysis may be preformed with appropriate threshold levels. Thus, an order for an event to occur, a combination of thresholds associated with different sensors must be met. Thus, each of the separate parameters may have their high level and low level trigger points. For example, the high temperature trigger alert point may be set at 38.7 deg C., while the low temperature trigger alert point may be set at 36.8 deg C. There may be a wide variability between the high and low trigger alert points, and such variability may mask ask body temperature trends in relationship to other monitored biometric parameters. Continuing further, if numerous other biometric parameters are simultaneously captured such as systolic and diastolic blood pressure, respiratory rate and pulse rate, the combination of such measured groups of data over time may be able to detect significant trends that pose a risk to the user. If biometric measurements of temperature show a rise, associated with concurrent measurements of a rise in heart rate and respiratory rate while demonstrating a progressive drop in systolic and diastolic blood pressure, such a system may trigger an alert to the user pointing out that such parameters fit known algorithmic associations for dehydration or pre-sepsis.

Even though each parameter by itself is not sufficient: to trigger an emergency alert, when together analyzed over time such data can be used to alert the user of potential issues and urge them electronically to seek appropriate medical intervention. Of course, if any one of the set alert parameters are triggered, or the algorithm determines that the rate of change is increasing or is of itself rapid, alert triggers can be initiated. Such powerful data analytics are much less relevant if the data cannot be transmitted to the user in an easily readable and familiar fashion. As such, a multimodal display is created to accomplish this so that the user can easily understand the parameter changes and the need to seek intervention. In doing so, potentially catastrophic issues can be identified earlier, leading to improved patient outcomes.

The warning may also specify the user's biometrics or sensor readings that triggered the event as well as the thresholds themselves so that the user may be alerted. The warning may include information, such as trends in sensor measurements, potential condition of the user, and other applicable information.

FIG. 1 is a pictorial representation of a communication system 100 in accordance with an illustrative embodiment. In one embodiment, the communication system 100 may represent a personal area network utilized by one or more users. The communication system 100 may also represent any number of systems, environments, or networks in which a user may utilize the described devices and components.

In one embodiment, the communication system 100 may include a user 102 utilizing wireless earpieces 104 and communicating with a communications device 106. The wireless earpieces 104 may communicate with the communications device 106 through a wireless signal 105. The reference to the user 102 may further represent the user utilizing the wireless earpieces 104. Likewise, each of users 108, 110, 112, and 114 may also be utilizing wireless earpieces 116 (not shown) similar to the wireless earpieces 104.

The wireless earpieces 104 are shown as worn and separately from their positioning within the ears of the user 102 for purposes of visualization. In one embodiment, the wireless earpieces 104 include a frame shaped to fit substantially within the ear of the user 102. The frame is a support structure that at least partially encloses and houses the electronic components of the wireless earpieces 104. The frame may include one or more sleeves configured to fit the inside of the ear of the user 102. The sleeves may have extremely tight tolerances to fit the ear of the user 102. In another embodiment, the sleeves may be custom built. In some applications, temporary adhesives, or securing mechanisms (e.g., clamps, straps, extenders, etc.) may be utilized to ensure that the wireless earpieces 104 remain in the ears of the user 102 even during the most rigorous and physical activities. For example, the wireless earpieces 104 may be utilized during water polo matches, football games, triathlons, or soccer matches. The wireless earpieces 104 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions.

In one embodiment, the users 102, 108-114 may represent a group, team, or association of individuals participating in a common activity, event, game, or other happening. For example, the users 102, 108-114 may represent teammates. The wireless earpieces 116 utilized by the users 102, 108-114 may be fully enabled or may have partial functionality during the activity. For example, the users 102, 108-114 may be football players and the communications functions of the wireless earpieces 116 may only be activated for a quarterback and a coach of the team the remaining devices perform sensory operations only and allow sound of the playing environment to be passed through or amplified to the user). The remaining wireless earpieces 116 may be utilized to monitor the condition of the users 102, 108-114 to ensure their vitals are within satisfactory ranges and that any tackles or hits do not result in forces sufficient to injure or concuss the specific players. As a result of the communications system 100, allowed communications may be enhanced while still monitoring the health and safety of the users 102, 108-114.

In one embodiment, the users 102, 108-114 may set a number of biometric thresholds for each of the wireless earpieces 116 that when exceeded may generate an alert specific to the worn wireless earpiece. The biometric thresholds may be set by each user or by a coach, administrator, caregiver, medical professional, or so forth. The biometric thresholds may also be set by default, databases, or so forth based on the sex, age, physical fitness, illnesses, and other user information. The biometric thresholds may be utilized to monitor the user and provide warnings as needed.

In another embodiment, the users 102, 108-114 may represent a team working jointly on a project, event, or operation. The users 102, 108-114 may be able to communicate with one another directly or indirectly utilizing the wireless earpieces 116. The communications system 100 may include any number of networks, repeaters, or extenders for extending the range and accessibility of the wireless earpieces. The communications device 106 may receive biometric information for each of the users 102, 108-114 enabling a single person or group too monitor the status and condition of the users 102, 108-114. In other embodiments, the biometric data acquired for the users 102, 108-114 for the corresponding wireless earpieces 116 may be sent remotely to any number of devices or systems. For example, the data may be archived in one or more remote servers and databases for subsequent retrieval through a cloud network and interface. The information reported by the wireless earpieces 116 may be sent;to emergency medical services, relatives of each of the users 102, 108-114, or other designated contacts. For example, a potentially dangerous impact detected by the wireless earpieces 104 for the user 102 may be reported to a coach utilizing the communications device 106 as well as the parents or designated guardians of the user 102.

The wireless earpieces 116 may be utilized for early detection and treatment of the users 102, 108-114 based on an injury (e.g., head strike, hit, crash, accident, fall, etc.) or other detected health event (e.g., overheating, hypothermia, heart attack, stroke, seizure, asthma attack, electrocution, etc.). The wireless earpieces 116 may also detect a particular sound pattern or audio, such as a user groaning, screaming, or other audio event that may be associated with a potential injury or health event. The wireless earpieces 116 may include a library stored within their respective memories including two or more thresholds or data, for determining whether the user may be experiencing an injury or health event.

The devices of the communication system 100 may include any number of devices, components, or so forth that may communicate with each other directly or indirectly through a wireless (or wired) connection, signal, or link, such as the wireless signals 105. The communications system 100 may be a network and may include any number of network components and devices, such as routers, servers, signal extenders, intelligent network devices, computing devices, or so forth. In one embodiment, the network of the communications system 100 represents a personal area network as previously disclosed. Communications, such as the wireless signals 105, within the communication system 100 may occur through the network or may occur directly between devices, such as the wireless earpieces 104 and the communications device 106 (e.g., direct communication of the wireless signal 105) or between the wireless earpieces 102 and the wireless device 128 (indirect communication through a Wi-Fi network utilizing the wireless signal 1053. In one embodiment, the communications system 100may communicate with or include a wireless network, such as a Wi-Fi, cellular (e.g., 3G, 4G, 5G, PCS, GSM, etc.), Bluetooth, NFMI, or other radio frequency network. The communications system 100 may also communicate with any number of hard wired networks, such as local area networks, coaxial networks, fiber-optic networks, or so forth. Communications within the communication system 100 may be operated by one or more users, service providers, or network providers.

As noted, both the wireless earpiece 116 as well as wearable or implantable devices utilized by the users 102, 108-114 may include a number of sensors including touch sensors, optical sensors, pulse oximeters, microphones, accelerometers, gyroscopes, global positioning chips, and so forth for detecting the biometrics, motion, location, and activities of the user. The information may be utilized to coordinate the audio, video, text, and graphical information presented to the user 116 (as well as the communications device 106) by the respective wireless earpieces 116. In one embodiment, the user 102 may program the wireless earpieces 104 to perform specific activities in response to a specific biometric reading, user motion, command or audio signal, other action. For examples, the user 102 may configure the wireless earpieces 102 (directly or indirectly through a user interface of a computing device communicating with the wireless earpieces 104) to send a cardiac alert in response to two or more of 1) sensing forces above a specified level, 2) heart rate dropping below a specified level, and 3) blood pressure dropping below a specified level.

Any number of user and environmental conditions may be utilized to generate alerts or other communications. The alerts may also be played audibly to the users 102, 108-114. For example, the user may be played an alert indicating "you may be overheating, consider drinking water and taking a break", or "you just experienced a significant jolt, do you have a concussion?" The wireless earpieces 116 as well as the communications device 106 may include logic for automatically calling, emergency services in response to events, such as the user's 102, pulse stopping or slowing significantly. As a result, the communication system 100 may be adapted to the needs and desires of the user 101.

In one embodiment, the communications device 106 may utilize short-range or long-range wireless communications to communicate with the wireless earpieces 116 through the wireless signal 105 or devices of the communications system 100 through the wireless signal 105. For example, the communications device 106 may include a Bluetooth and cellular transceiver within the embedded logical components. For example, the wireless signal 106 may be a Bluetooth, Zigbee, Ant+, NFMI, or other short range wireless communication.

The communications device 106 may represent any number of wireless or wired electronic communications or computing devices, such as smart phones, laptops, desktop computers, control systems, tablets, displays, gaming devices, music players, personal digital assistants, vehicle systems, or so forth. The communications device 106 may communicate utilizing any number of wireless connections, standards, or protocols (e.g., near field communications, Bluetooth, Wi-Fi, wireless Ethernet, etc.). For example, the communications device 106 may be a touch screen cellular phone that communicates with the wireless earpieces 116 utilizing Bluetooth communications. The communications device 106 may implement and utilize any number of operating systems, kernels, instructions, or applications that may make use of the sensor data or user input received from the wireless earpieces 116 For example, the communications device 106 may represent any number of Android, iOS, Windows, open platforms, or other systems. Similarly, the communications device 106 or the wireless earpieces 116 may include a number of applications that utilize the user input, biometric data, and other feedback from the wireless earpieces 116 to display applicable information and data, control the applications, play audible or tactile alerts, or make other selections. For example, biometric information (including, high, low, average, or other values) may be processed by the wireless earpieces 116 or the communications device 106 to display experienced forces, heart rate, blood oxygenation, altitude, speed, distance traveled, calories burned, or other applicable information.

In one embodiment, the wireless device 106 may include any number of input components and sensors (e.g., similar to those described with regard to the wireless earpieces 116) that may be utilized to augment the input and sensor readings of the wireless earpieces 116. For example, a microphone of the wireless device 106 may determine an amount and type of ambient noise. The noise may be analyzed and utilized to filter the sensor readings made by the wireless earpieces 116 to maximize the accuracy and relevance of the sensor measurements of the wireless earpieces 116. For example, the wireless earpieces 116 may adjust the microphone sensitivity or filter out background noise based on measurements performed by the communications device 106. Filtering, tuning, and adaptation for the sensor measurements may be made for signal noise, electronic noise, or acoustic noise, all of which are applicable in the communication system 100. Sensor measurements made by either the wireless earpieces 116 or communications device 106 may be communicated with one another in the communication system 100. As noted, the communications device 106 is representative of any number of personal computing, communications, exercise, medical, or entertainment devices that may communicate with the wireless earpieces 116.

With respect to the wireless earpieces 116, sensor measurements or user input may refer to measurements made by one or both of the wireless earpieces 116 in a set. For example, the right wireless earpieces 104 may determine that the user may have experienced a concussive event even though the event was not detected by the left wireless earpiece 104. The wireless earpieces 104 may also switch back and forth between sensors of the left and right wireless earpieces 104 in response to varying noise, errors, or more accurate signals for both of the wireless earpieces 104. As a result, the clearest sensor signal may be utilized at any given time. In one embodiment, the wireless earpieces 104 may switch sensor measurements in response to the sensor measurements exceeding or dropping below a specified threshold.

The user 102 may also be wearing or carrying any number of sensor-enabled devices, such as heart rate monitors, pacemakers, smart glasses smart watches or bracelets (e.g., Apple watch, Fitbit, etc.), or other sensory devices that may be worn, attached to, or integrated with the user 102. The data and information from the external sensor devices may be communicated to the wireless earpieces 104. In another embodiment, the data and information from the external sensor devices may be utilized to perform additional processing of the information sent from the wireless earpieces 104 to the communications device 106.

The sensors of the wireless earpieces 104 may be positioned at enantiomeric locations. For example, a number of colored light emitting diodes may be positioned to provide variable data and information, such as heart rate, respiratory rate, and so forth. The data gathered by the LED arrays may be sampled and used alone or in aggregate with other sensors. As a result, sensor readings may be enhanced and strengthened with additional data.

In another embodiment, the wireless earpieces 102 may represent or communicate with other wireless devices that may be ingested or implanted into a user. For example, the described electronics may be endoscopic pills, pacemakers, tracking devices, contact lenses, oral implants, bone implants, artificial organs, or so forth.

Figure 2:
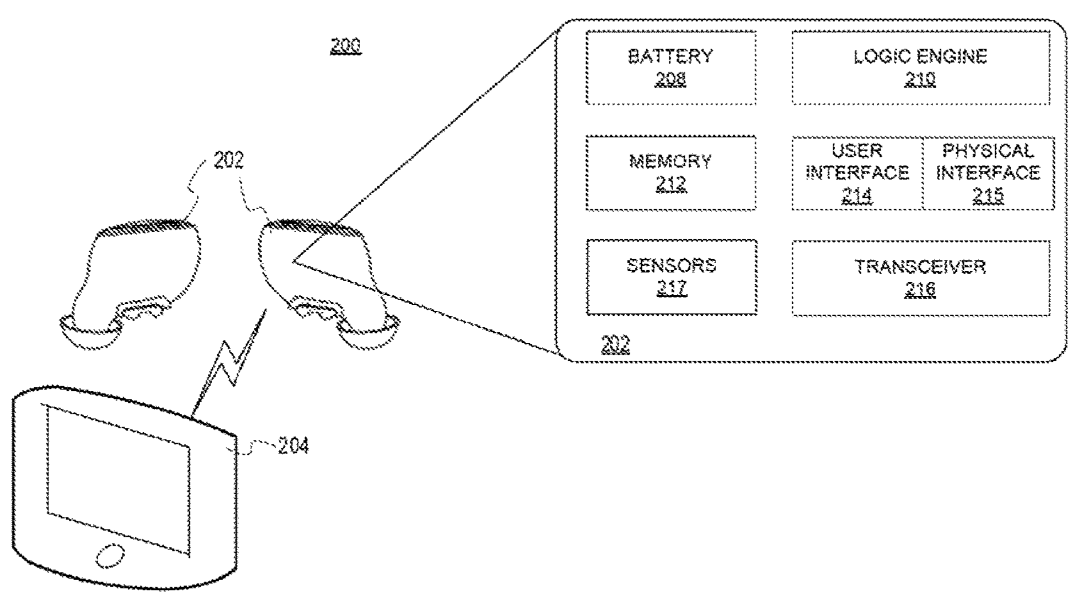
FIG. 2 is a block diagram of wireless earpieces in accordance with an illustrative embodiment.

FIG. 2 is a block diagram of a wireless earpiece system 200 in accordance with an illustrative embodiment. In one embodiment, the wireless earpiece system 200 may include wireless earpieces 202 (described collectively rather than individually). In one embodiment, the wireless earpiece system 200 may enhance communications and functionality of the wireless earpieces 202.

As shown, the wireless earpieces 202 may be wirelessly linked to a computing device 204. For example, the computing device 204 may represent a wireless tablet computer. User input and commands may be received from either the wireless earpieces 202 or the computing device 204 for implementation on either of the devices of the wireless earpiece system 200 (or other externally connected devices). As previously noted the wireless earpieces 102 may be referred to or described herein as a pair (wireless earpieces) or singularly (wireless earpiece). The description may also refer to components and functionality of each of the wireless earpieces 202 collectively or individually.

In some embodiments, the computing device 204 may act as a logging tool for receiving information, data, or measurements made by the wireless earpieces 202. For example, the computing device 204 may download data from the wireless earpieces 202 in real-time. As a result, the computing device 204 may be utilized to store, display, and synchronize data to the wireless earpieces 202. For example, the computing device 204 may display pulse, blood pressure, blood oxygenation, temperature, distance, calories burned, and so forth as measured by the wireless earpieces 202. The computing device 204 may be configured to receive and display alerts that indicate a specific health event or condition has been met. For example, if the forces applied to the sensors 217 (e.g., accelerometers) indicates that the user may have experienced a concussion or serious trauma, the wireless earpieces 202 may generate and send a message to the computing device 204. The wireless earpieces 202 and the computing device 204 may have any number of electrical configurations, shapes, and colors and may include various circuitry connections, and other components.

In one embodiment, the wireless earpieces 202 may include a battery 208, a logic engine 210, a memory 212, a user interface 214, a physical interface 215, a transceiver 216, and sensors 217. The computing device 204 may have any number of configurations and include components and features as are known in the art.

The battery 208 is a power storage device configured to power the wireless earpieces 202. Likewise, the battery 218 is a power storage device configured to power the computing device 204. In other embodiments, the battery 208 may represent a fuel cell, thermal electric generator, piezo electric charger, solar charger, ultra-capacitor, or other existing or developing power generation or storage technologies.

The logic engine 210 is the logic that controls the operation and functionality of the wireless earpieces 202. The logic engine 210 may include circuitry, chips, and other digital logic. The logic engine 210 may also include programs, scripts, and instructions that may be implemented to operate the logic engine 210. The logic engine 210 may represent hardware, software, firmware, or any combination thereof. In one embodiment, the logic engine 210 may include one or more processors. The logic engine 210 may also represent an application specific integrated circuit (ASIC) or field programmable gate array (FPGA). The logic engine 210 may utilize information from the sensors 212 to determine the biometric information, data, and readings of the user. The logic engine 210 may also analyze the sensor measurements to determine when two or more parameters, variables, or thresholds are exceeded. The logic engine 202 may utilize this information and other criteria to inform the user of the biometrics (e.g., audibly, through an application of a connected device, tactilely, etc.), exceeded thresholds, users actual or perceived condition, or suggested steps or activities. The logic engine 202 may send warnings, alerts, pop-ups, audio communications, tactile feedback, or other messages. The logic engine 210 may also manage communications with the computing device 204 through the transceiver 216.

The logic engine 210 may also process user input to determine commands implemented by the wireless earpieces 202 or sent to the wireless earpieces 204 through the transceiver 216. Specific actions may be associated with biometric data thresholds. For example, the logic engine 210 may implement a macro allowing the user to associate biometric data as sensed by the sensors 217 with specified commands, alerts, and so forth. For example, if both the temperature and blood pressure of the user is above or below high and low thresholds, an audible alert may be played to the user and a communication sent to the computing device 204.

In one embodiment, a processor included in the logic engine 210 is circuitry or logic enabled to control execution of a set of instructions. The processor may be one or more microprocessors, digital signal processors, application-specific integrated circuits (ASIC), central processing units, or other devices suitable for controlling art electronic device including one or more hardware and software elements, executing software, instructions, programs, and applications, converting and processing signals and information, and performing other related tasks.

The memory 212 is a hardware element, device, or recording media configured to store data or instructions for subsequent retrieval or access at a later time. The memory 212 may represent static or dynamic memory. The memory 212 may include a hard disk, random access memory, cache, removable media drive, mass storage, or configuration suitable as storage for data, instructions, and information. In one embodiment, the memory 212 and the logic engine 210 may be integrated. The memory may use any type of volatile or non-volatile storage techniques and mediums. The memory 212 may store information related to the status of a user, wireless earpieces 202, computing device 204, and other peripherals, such as a wireless device, smart glasses, smart watch, smart case for the wireless earpieces 202, wearable device, and so forth. In one embodiment, the memory 212 may display instructions, programs, drivers, or an operating, system for controlling the user interface 214 including one or more LEDs or other light emitting components, speakers, tactile generators (e.g., vibrator), and so forth. The memory 212 may also store the thresholds, conditions, or biometric data (e.g., biometric and data library) associated with biometric events.

The transceiver 216 is a component comprising both a transmitter and receiver which may be combined and share common circuitry on a single housing. The transceiver 216 may communicate utilizing Bluetooth, Wi-Fi, ZigBee, Ant+, near field communications, NFMI, wireless USB, infrared, mobile body area networks, ultra-wideband communications, cellular (e.g., 3G, 4G, 5G, PCS, GSM, etc.), infrared, or other suitable radio frequency standards, networks, protocols, or communications. The transceiver 216 may also be a hybrid transceiver that supports a number of different communications. For example, the transceiver 216 may communicate with the computing device 204 utilizing Bluetooth communications and inter wireless earpiece communications (e.g., between the left and right wireless earpieces) may be NFMI communications.

The components of the wireless earpieces 202 may be electrically connected utilizing any number of wires, contact points, leads, busses, wireless interfaces, or so forth. In addition, the wireless earpieces 202 may include any number of computing and communications components, devices or elements which may include busses, motherboards, circuits, chips, sensors, ports, interfaces, cards, converters, adapters, connections, transceivers, displays, antennas, and other similar components. The physical interface 215 is hardware interface of the wireless earpieces 202 for connecting and communicating with the computing device 204 or other electrical components, devices, or systems.

The physical interface 215 may include any number of pins, arms, or connectors for electrically interfacing with the contacts or other interface components of external devices or other charging or synchronization devices. For example, the physical interface 215 may be a micro USB port. In one embodiment, the physical interface 215 is a magnetic interface that automatically couples to contacts or an interface of the computing device 204. In another embodiment, the physical interface 215 may include a wireless inductor for charging the wireless earpieces 202 without a physical connection to a charging device.

The user interface 214 is a hardware interface for receiving commands, instructions, or input through the touch (haptics) of the user, voice commands, or predefined motions. The user interface 214 may be utilized to control the other functions of the wireless earpieces 202. The user interface 214 may include the LED array, one or more touch sensitive buttons or portions, a miniature screen or display, or other input/output components. The user interface 214 may be controlled by the user or based on commands received from the computing device 204 or a linked wireless device.

In one embodiment, the user may provide feedback by tapping the user interface 214 once, twice, three times, or any number of times. Similarly, a swiping motion may be utilized across or in front of the user interface 214 (e.g., the exterior surface of the wireless earpieces 202) to implement a predefined action. Swiping motions in any number of directions or gestures may be associated with specific activities, such as play music, pause, fast forward, rewind, activate a digital assistant (e.g., Siri, Cortana, smart assistant, etc.). The swiping motions may also be utilized to control actions and functionality of the computing device 204 or other external devices (e.g., smart television, camera array, smart watch, etc.). The user may also provide user input by moving his head in a particular direction or motion or based on the user's position or location. For example, the user may utilize voice commands, head gestures, or touch commands to change the content displayed by the computing device 204. The user interface 214 may also provide a software interface including any number of icons, soft buttons, windows, links, graphical display elements, and so forth.

The sensors 217 may include pulse oximeters, accelerometers, gyroscopes, magnetometers, thermometers, microphones (e.g., ear hone, external, etc.), inertial sensors, photo detectors, miniature cameras, and other similar instruments for detecting location, forces or impact, orientation, motion, and so forth. The sensors 217 may also be utilized to gather of images, data, and measurements and determine an acoustic noise level, electronic noise in the environment, ambient conditions, and so forth. The sensors 217 may provide measurements or data that may be utilized to filter or select images for display by the computing device 204. For example, motion or sound detected on the left side of the user may be utilized to command the computing device 204 to display camera images from the left side of the user. Motion or sound may be utilized, however, any number of triggers may be utilized to send commands to the computing device 204. The sensors 217 may read both user data as well as environmental data.

The computing device 204 may include components similar in structure and functionality to those shown for the wireless earpieces 202. The computing device may include any number of processors, batteries, memories, busses, motherboards, chips, transceivers, peripherals, sensors, displays, cards, ports, adapters, interconnects, and so forth. In one embodiment, the computing device 204 may include one or more processors and memories for storing instructions. The instructions may be executed as part of an operating system, application, browser, or so forth to implement the features herein described. In one embodiment, the wireless earpieces 202 may be magnetically or physically coupled to the computing device 204 to be recharged or synchronized or to be stored.

In another embodiment, the computing device 204 may also include sensors for detecting the location, orientation, and proximity of the wireless earpieces 202. For example, the computing device 204 may include optical sensors or cameras for capturing images and other content. When providing sensor information, the wireless earpieces 202 may utilize and detect any number of wavelengths and spectra to provide distinct images, enhancement, data, and biometrics of the user.

As originally packaged, the wireless earpieces 202 and the computing device 204 may include peripheral devices such as charging cords, power adapters, inductive charging adapters, solar cells, batteries, lanyards, additional light arrays, speakers, smart case covers, transceivers cellular, etc.), or so forth.

Figure 3:
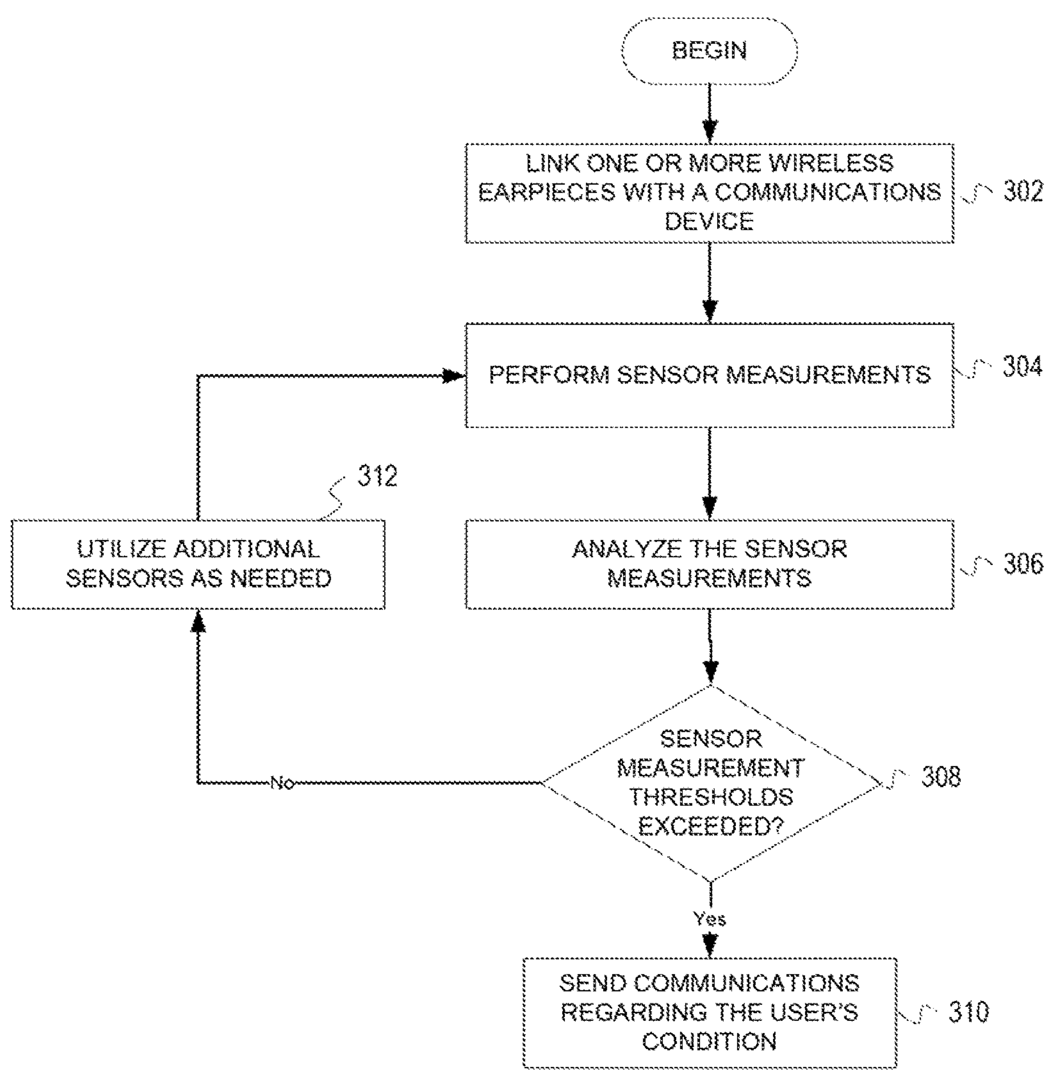
FIG. 3 is a flowchart of a process for determining a condition of a user utilizing wireless earpieces in accordance with an illustrative embodiment.

FIG. 3 is a flowchart of a process for determining a condition of a user utilizing wireless earpieces in accordance with an illustrative embodiment. The process of FIG. 3 may be implemented by one or more wireless earpieces, wearable devices, and any number of other devices communicating directly or through a personal area network. In one embodiment, the process of FIG. 4 may be implemented by one or more wireless earpieces, such as the wireless earpieces 102 of FIG. 1. For example, the method of FIG. 4 may be performed for both of the wireless earpieces as a pair/set or for each of wireless earpieces individually to communicate with the wireless dongle.

In one embodiment, the wireless earpieces may perform biometric readings or user input to authenticate or identify the user and that the user is authorized to perform the process of FIG. 3 and function for the user. In one embodiment, the biometric readings and user input may include one or more of pulse, hand gestures, designated motions, voice amplitude, voice frequency, skin conductivity, vocabulary (e.g., spoken password, phrase, recognized speech), blood oxygenation, temperature, heart beat pattern, ear map, calories expended per time period, sweat levels, orientation, position, and so forth.

In one embodiment, the process of FIG. 3 may begin by linking one or more wireless earpieces with a communications device (step 302). The wireless earpieces may be linked with the smart glasses utilizing any number of communications, standards, or protocols. For example, the devices may be linked by a Bluetooth connection. The process may require that the devices be paired utilizing an identifier, such as a passcode, password, serial number, voice identifier, radio frequency, or so forth. The wireless earpieces may be linked with the communications device and any number of other devices directly or through a network, such as a personal area network.

Next, the wireless earpieces perform sensor measurements (step 304). The sensor measurements may include performing any number of measurements. The measurements may be performed utilizing a predefined sampling rate (e.g., 1 second, 100 ms, etc.). The measurements may also be triggered in response to specific detected events, such as change in user orientation or position (e.g., change from vertical to horizontal position), changes in velocity (e.g., extreme starts, stops, accelerations, etc.), high forces (e.g., impacts, jolts, etc.), or detected events from other sensors worn by the user.

Next, the wireless earpieces analyze the sensor measurements (step 306). The sensor measurements may be processed or otherwise evaluated by the wireless earpieces. For example, one or more processors of the wireless earpieces may process the incoming data measurements. The sensor measurements are processed for subsequent analysis, determinations, or decisions, implemented by the wireless earpieces.

Next, the wireless earpieces determine whether sensor measurement thresholds are exceeded (step 308). The wireless earpieces may include any number of thresholds, including, high and low thresholds for measurements and parameters, such as forces experienced by the user, acceleration, temperature, pulse rate, blood oxygenation, and so forth. For example, the wireless earpieces may have a profile that sets two or more thresholds for each biometric reading. In one embodiment, two or more of the thresholds may be violated in order to send communications as specified in step 310 (e.g., temperature, blood pressure, etc.).

In response to determining the sensor measurement thresholds are exceeded in step 308, the wireless earpieces send communications regarding the user's condition (step 310). In one embodiment, the communications are sent to the communications device linked with the wireless earpieces. For example, the communications may be an alert, status update, warning, or other similar information. In one embodiment, the communication may be an alert indicating that the user may have experienced a concussion. Likewise, the communication may indicate that the both the user's temperature and blood presser has exceeded a threshold (whether high or low) and may be experiencing overheating. The information from the wireless earpieces may be particularly valuable for users, such as athletes that may be playing, practicing, or competing in extreme events, conditions, or other settings. For example, the wireless earpieces may be utilized to ensure that high school football players in heat prone areas do not overexert themselves, possibly resulting in heat stroke. The communications device may be monitored by team personnel, referees, or umpires, health services groups, parents, or other monitoring groups to ensure the safety of the user.

In response to determining the sensor measurement thresholds are not exceeded in step 308, the wireless earpieces utilize additional sensors as needed (step 312). In the additional, sensors may be worn, or integrated with the user. For example, additional measurements may be taken by a smart watch, or chest strap worn by the user. In another example, a pacemaker of the user may provide additional data regarding pulse, heart rhythm, and other applicable or measured information. During step 312, the software utilized by the wireless earpieces or associated wireless devices and control/baseline data utilized to compare the sensor measurements may be updated.

Figure 4:
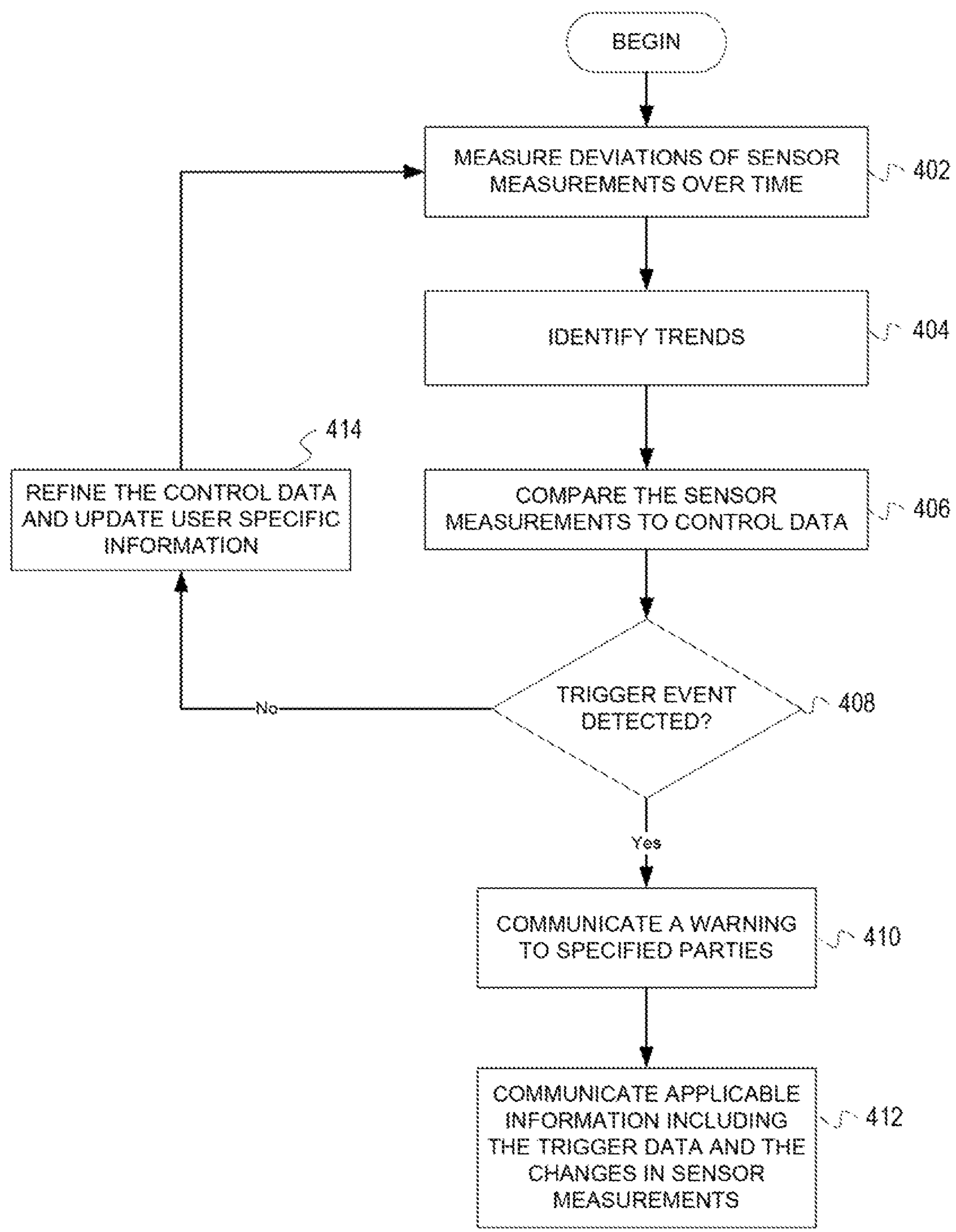
FIG. 4 is a flowchart of a process for monitoring a user utilizing wireless earpieces in accordance with an illustrative embodiment.

FIG. 4 is a flowchart of a process for monitoring a user utilizing wireless earpieces in accordance with an illustrative embodiment. The process of FIG. 4 is similar to that of FIG. 3 and may be performed as part of the process of FIG. 3 or as an independent method or set of steps. The steps of FIG. 3 and FIG. 4 may be integrated or combined in any number of combinations.

The process of FIG. 4 may begin by measuring deviations of sensor measurements over time (step 402). Sensor measurements may be performed constantly, at intervals, or as otherwise specified by the wireless earpieces, the user, or an administrator or other controlling party. As previously noted, the biometric readings taken by the sensors may include heart rate, respiratory rate, pulse oximetry, body temperature, systolic and diastolic blood pressure, orientation (e.g., standing, laying down, sitting, etc.), user status (e.g., sleeping, dreaming, awake, drowsy, etc.), stages of sleep (stages 1, 2, 3, 4, rapid eye movement (REM), user motion, blood chemical levels, calories burned, sweat levels, and so forth. These sensors may monitor biometrics as well as environmental changes in deviations. For example, the wireless earpieces may note when the temperature of the user's environment has increased significantly. The wireless earpieces may track multiple biometric and environmental variables over time to best determine the user's condition, activities, mindset, and status.

Next, the wireless earpieces identify trends (step 404). The trend may indicate a general direction, movement, change, or progression of the data measured by the sensors. As previously noted, the sensor data may be analyzed by the wireless earpieces alone, by a linked computing or communications device, or utilizing the wireless earpieces and a combination of other devices, systems, equipment, components, or so forth.

Next, the wireless earpieces compare the sensor measurements to control data (step 406). The control data may correspond to user specific information including baseline readings, default data, or so forth. In one example, the control data may correspond to programmed or baseline data set by the user, such as user biometrics when the user is walking, running, swimming, playing sports, sleeping, resting, or any number of activities. The wireless earpieces may also include control data that is determined or aggregated from any number of users. The most appropriate data set may be selected from the control data corresponding to the user's age, sex, ethnicity, weight, or other measured or user entered parameters, factors, and conditions.

Next, the wireless earpieces determine whether a trigger event is detected (step 408). The trigger event may represent any number of thresholds, factors, levels, baseline/comparative readings, or parameters. In one embodiment, the thresholds utilized for the trigger event may include one or more upper or lower threshold levels or values. The determination of step 408 may be made based on the measurements, analysis, and processing performed by the wireless earpieces. In one example, the trigger event may be associated with a temperature of a user. An event may be triggered in response to 1) the temperature of the user reaching either 102° as a high threshold or 95° as a low threshold as well as 2) the heart rate of the user being above 140 beats per minute (bpm) or below 55 bpm. Any combination, group, or sets of one or more, or two or more, or numerous thresholds variables may be set for the thresholds utilized during step 408. If both the temperature and the heart rate thresholds are exceeded, the wireless earpieces may trigger a response. In another example, the respiratory rate and blood pressure of the user may also be utilized as factors to determine whether the trigger event is detected.

If the trigger event is reached during step 408, the wireless earpieces communicate a warning to specified parties (step 410). In some embodiments, the morning may represent a health risk to the user. In one example, if biometric readings show a rise in temperature, associated with a concurrent rise in heart rate and respiratory rate, while demonstrating a progressive drop in systolic and diastolic blood pressure, the wireless earpieces may trigger an alert to the user indicating that such patterns are typically associated with dehydration or pre-sepsis. As a result, the user may be able to take a break, drink water, visit with a medical professional, or so forth with a similar recommendation communicated to the user as part of step 410.

Each of the separate thresholds may be associated with distinct event, alerts or warnings, or indicators presented to the user or specified parties (step 412). As previously noted, the warning may be communicated audibly, tactilely, or electrically (e.g., electrical pulses) through the wireless earpieces. Similarly, the warning may be communicated to any number of other users, systems, administrators, caregivers, medical professionals, or electronic devices directly or through one or more network connections. In one example, the warning may be queued for communication in response to the wireless earpieces being within range of a specified wireless device, interface, network component, or so forth. Even though each threshold, parameter, or value by itself may not be sufficient to trigger the event during step 408, when the thresholds are analyzed together over time, such data may be used to trigger the event so that the user and other specified parties may be warned of potential issues. In some embodiments, the threshold may not be exceeded or passed for the trigger event is reached. For example, if analysis of the sensor measurements and trends show a rate of change for biometric readings that is unacceptable, the trigger event may be reached before the biometric readings even reached the thresholds to best protect the user. The thresholds may also represent rates of change and if those rates of change are exceeded, the trigger event may be detected.

Next, the wireless earpieces communicate applicable information including the trigger data and changes in the sensor measurements (step 412). The applicable information may include the user status (if known), applicable biometric readings, environmental readings corresponding to the user, as well as suggested actions or activities to address the triggered alert. The trigger data and the changes in the sensor measurements are also communicated to the user to give additional background information, details, data, information, and context for why the event was triggered. In one embodiment, the steps 410 and 412 may can be combined into a single step. During steps 410, 412 powerful data analytics are transmitted to the user in an easily understood fashion (e.g., audio alerts, tactile alerts, alerts communicated to an app of a wireless device associated with the wireless earpieces, etc.).

If the trigger event is not reached during step 408, the wireless earpieces refine the control data and update user specific information (step 414). The control data may be updated only as needed to provide the best results and processing of the sensor measurements. During step 414, the wireless earpieces may periodically, intermittently, or as selected by the user update user specific information, such as thresholds utilized to set the trigger events. In one embodiment, the software or algorithms utilized to perform analysis, identification, comparisons, or so forth may be tuned or updated during step 414. In some embodiments, no updates, refining, or processing may be performed during step 414. For example, user specific conditions, such as the environment, may be utilized to tune the analysis performed. In hotter environments, the thresholds for the temperature of the user may be increased or decreased accordingly.

Figure 5:
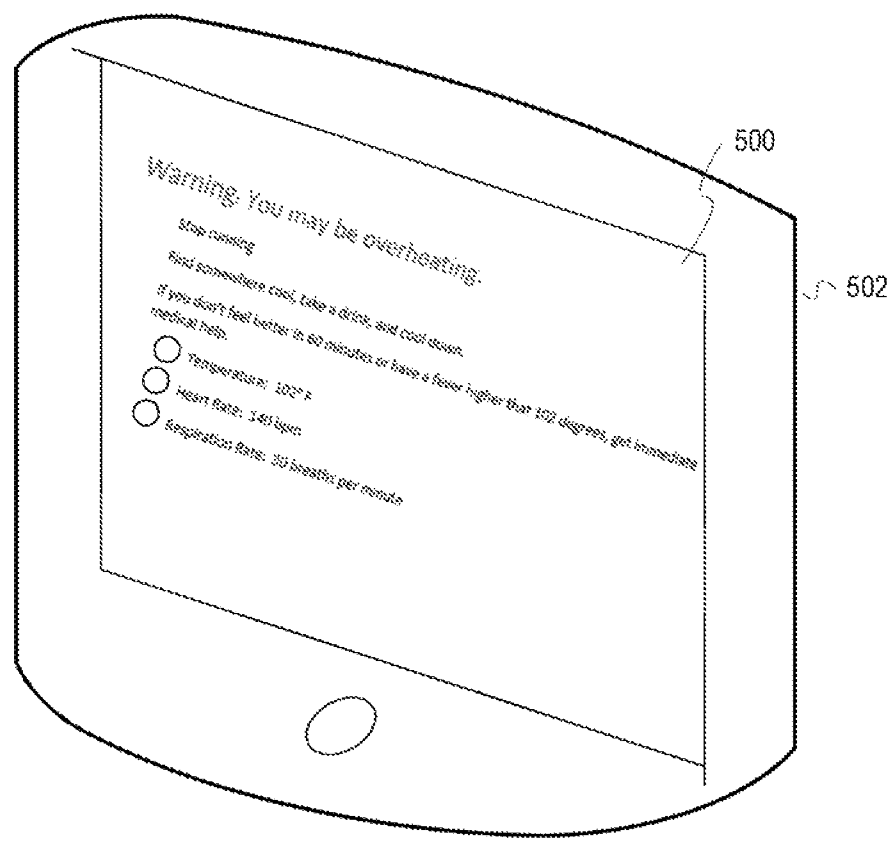
FIG. 5 is a pictorial representation of a display in accordance with an illustrative embodiment.

FIG. 5 is a pictorial representation of a graphical user interface 500 in accordance with an illustrative embodiment. The graphical user interface 500 may be presented by a wireless device 502, such as the wireless device 106 of FIG. 1. In one embodiment, the graphical user interface 500 may present information measured and communicated to the wireless device 502 by the wireless earpieces.

The information presented by the graphical user interface 500 may also be communicated audibly through the wireless earpieces. In addition, any number of communications methods including projection, tactile feedback, and so forth may be used to communicate content captured by the wireless earpieces.

In one embodiment, the wireless earpieces may capture information indicating that the user is overheating. Overheating may lead to dangerous conditions, such as heatstroke and any number of associated physical problems. The graphical user interface 500 may provide feedback to the user. The graphical user interface 500 may provide instructions or feedback to the user. For example, the graphical user interface 502 may present a physical or environmental warning. The graphical user interface 500 may also present the biometric readings to the user, such as temperature, heart rate, respiration rate, and so firth. The graphical user interface 500 may indicate the user's current biometric readings as well as the threshold that was exceeded to trigger the event, such as the graphical user interface 500 and associated content being displayed to the user or played by the wireless earpieces.

The graphical user interface 500 may be utilized to present information as well as receive content from the user. For example, the graphical user interface 500 may receive content from the user including thresholds utilized to generate alerts, authentication settings, alert settings, and so forth.

The illustrative embodiments provide a system, method, personal area network, and wireless earpieces for communicating sensor measurements to one or more externally connected devices. The sensor measurements are utilized to send communications, updates, alerts, or other information relative to the condition of the user as well as the user's environment. In one embodiment, the sensor measurements may be utilized to protect the user based on one or more sensor measurements that are made, such as potential head trauma, overheating, dropping body temperature, low blood oxygenation, excessive or low heart rate, or other applicable information determined by the sensors of the wireless earpieces.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system for other electronic device(s to perform a process according to embodiments, whether presently described or not, since every conceivable variation is not enumerated herein. A machine readable medium includes any mechanism for storing or transmitting information in a form (e.g. software, processing application) readable by a machine (e.g., a computer). The machine-readable medium may include, but is not limited to, magnetic storage medium; optical storage medium; magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using, an Internet Service Provider).

Figure 6:
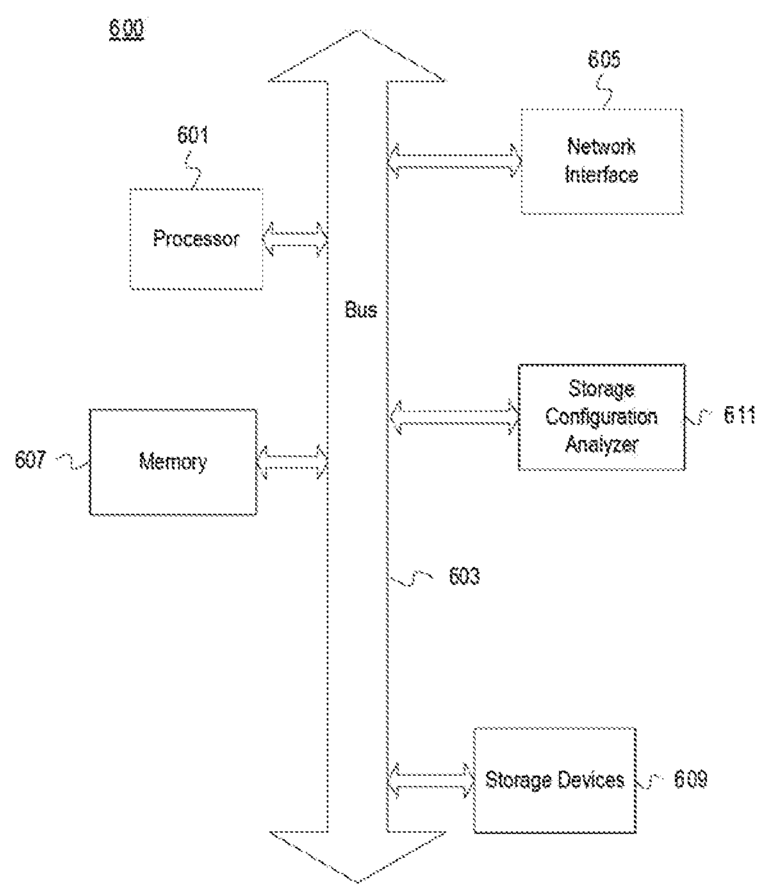
FIG. 6 depicts a computing system in accordance with an illustrative embodiment.

FIG. 6 depicts a computing system 600 in accordance with an illustrative embodiment. For example, the computing system 600 may represent a device, such as the wireless device 204 of FIG. 2. The computing system 600 includes a processor unit 601 (possibly including multiple processors, multiple cores, multiple nodes, and/or implementing multi-threading, etc.). The computing system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The system memory 607 embodies functionality to implement embodiments described above. The system memory 607 may include one or more functionalities that facilitate retrieval of the audio information associated with an identifier. Code may be implemented in any of the other devices of the computing system 600. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for communicating utilizing a pair of wireless earpieces, comprising:

performing sensor measurements of a user utilizing a plurality of biometric sensors of the pair of wireless earpieces, wherein the plurality of biometric sensors includes at least a first biometric sensor and a second biometric sensor and the sensor measurements include at least a first sensor measurement from the first biometric sensor and a second sensor measurement from the second biometric sensor, wherein the sensor measurements from at least the first biometric sensor and the second biometric sensor are used in identifying the user;

analyzing the sensor measurements using a processor of the pair of wireless earpieces wherein the analyzing comprises comparing the first sensor measurement with a first high threshold and a first low threshold within a first profile associated with biometric readings from the first biometric sensor, if the first sensor measurement is above the first high threshold or below the first low threshold then determining that the first sensor measurement falls outside a first range defined within the first profile and associated with biometric readings from the first biometric sensor, comparing the second sensor measurement with a second high threshold and a second low threshold within a second profile associated with biometric readings from the second biometric sensor, if the second sensor measurement is above the second high threshold or below the second low threshold then determining that the second sensor measurement falls outside a second range defined within the second profile and associated with biometric readings from the second biometric sensor;

determining by the processor of the pair of wireless earpieces whether the sensor measurements are indicative of a health condition in response to both the first sensor measurement falling outside the first range defined within the first profile and the second sensor measurement falling outside the second range defined within the second profile; and communicating an alert to the user in response to a determination that the sensor measurements are indicative of the health condition.

2. The method of claim 1, wherein the analyzing further comprises identifying one or more trends associated with at least one rate of change of the sensor measurements.

3. The method of claim 1, wherein the first profile and the second profile are associated with at least two of a pulse rate, voice or audio output, blood pressure, temperature, and user experienced forces.

4. The method of claim 1, wherein the sensor measurements indicate that the user is in distress.

5. The method of claim 1, wherein the pair of wireless earpieces further communicate with an associated electronic device using a transceiver of the pair of wireless earpieces to determine whether at least the first sensor measurement falls outside the first range associated with the first profile and the second sensor measurement falls outside the second range associated with the second profile.

6. The method of claim 1, further comprising:

refining control data for the user.

7. A wireless earpiece, comprising:

a frame for fitting in an ear of a user;

a processor disposed within the frame for controlling functionality of the wireless earpiece;

a memory disposed within the frame and in communication with the processor, wherein the memory stores a plurality of thresholds that include at least a first set of thresholds and a second set of thresholds;

a plurality of sensors operatively connected to the processor for measuring biometric readings of the user, wherein the plurality of sensors includes at least a first biometric sensor and a second biometric sensor and the biometric readings include at least a first biometric reading from the first biometric sensor and a second biometric reading from the second biometric sensor and wherein the first biometric sensor is a first type of biometric sensor and the second biometric sensor is a second type of biometric sensor; and a transceiver disposed within the frame and operatively connected to the processor for communicating with at least a wireless device;

wherein the processor analyzes the sensor measurements using a processor of the pair of wireless earpieces to determine an identity of the user and to compare the first sensor measurement with a first high threshold and a first low threshold within a first profile associated with biometric readings from the first biometric sensor, if the first sensor measurement is above the first high threshold or below the first low threshold then determine that the first sensor measurement falls outside a first range defined within the first profile and associated with biometric readings from the first biometric sensor, compare the second sensor measurement with a second high threshold and a second low threshold within a second profile associated with biometric readings from the second biometric sensor, if the second sensor measurement is above the second high threshold or below the second low threshold then determine that the second sensor measurement falls outside a second range defined within the second profile and associated with biometric readings from the second biometric sensor;

determine whether the biometric readings are indicative of a health condition in response to at least the first biometric reading falling outside the first range and the second biometric reading falling outside the second range, and communicates the alert to the user in response to a determination that the biometric readings are indicative of the health condition; and wherein the transceiver establishes a Bluetooth link with the wireless device, wherein the alert is communicated to the wireless device for display to the user utilizing a graphical user interface; and wherein the processor provides for identifying one or more trends associated with at least one rate of change of the biometric readings.

8. The wireless earpiece of claim 7, wherein the first profile and the second profile include at least two of a pulse rate, voice or audio output, blood pressure, temperature, and user experienced forces.

9. The wireless earpiece of claim 8, wherein the plurality of thresholds are set by the user.

10. A wireless earpiece comprising:

a processor for executing a set of instructions; and memory for storing the set of instructions, wherein the set of instructions are executed to:

perform sensor measurements of a user utilizing sensors of the wireless earpiece, wherein the sensors include at least a first biometric sensor and a second biometric sensor and the sensor measurements include at least a first sensor measurement from the first biometric sensor and a second sensor measurement from the second biometric sensor and wherein the first biometric sensor is a first type of biometric sensor and the second biometric sensor is a second type of biometric sensor different than the first type of biometric sensor, wherein the sensor measurements from at least the first biometric sensor and the second biometric sensor are used in identifying the user;

analyze the sensor measurements wherein the analyzing comprises comparing the first sensor measurement with a first high threshold and a first low threshold within a first profile associated with biometric readings from the first biometric sensor, if the first sensor measurement is above the first high threshold or below the first low threshold then determining that the first sensor measurement falls outside a first range defined within the first profile and associated with biometric readings from the first biometric sensor, comparing the second sensor measurement with a second high threshold and a second low threshold within a second profile associated with biometric readings from the second biometric sensor, if the second sensor measurement is above the second high threshold or below the second low threshold then determining that the second sensor measurement falls outside a second range defined within the second profile and associated with biometric readings from the second biometric sensor;

determine whether the sensor measurements are indicative of a health condition in response to at least the first sensor measurement falling outside the first range and the second sensor measurement falling outside the second range; and communicate an alert to the user in response to a determination that the sensor measurements are indicative of the health condition;

wherein the set of instructions are further executed to:

identify one or more trends associated with at least one rate of change of the sensor measurements.

11. The wireless earpiece of claim 7, wherein the processor is further configured to implement a macro for allowing the user to associate the biometric readings with an alert, the alert indicative of the health condition of the user.

12. The wireless earpiece of claim 8, wherein feedback related to the biometric readings is displayed via the graphical user interface.

* * * * *